US008301399B2

(12) United States Patent
Ohgoh

(10) Patent No.: US 8,301,399 B2
(45) Date of Patent: Oct. 30, 2012

(54) METHOD FOR PREDICTING LIFETIME OF PHOTO-SEMICONDUCTOR DEVICE AND DRIVE APPARATUS

(75) Inventor: Tsuyoshi Ohgoh, Ashigarakami-gun (JP)

(73) Assignee: Nichia Corporation, Tokushima (JP)

( * ) Notice: Subject to any disclaimer, the term of this patent is extended or adjusted under 35 U.S.C. 154(b) by 553 days.

(21) Appl. No.: 12/418,028

(22) Filed: Apr. 3, 2009

(65) Prior Publication Data

US 2009/0254287 A1 Oct. 8, 2009

(30) Foreign Application Priority Data

Apr. 4, 2008 (JP) ................................ 2008-098322

(51) Int. Cl.
*G01B 3/44* (2006.01)
*G08B 21/00* (2006.01)
*G01C 25/00* (2006.01)

(52) U.S. Cl. .......................... 702/34; 702/116; 340/635

(58) Field of Classification Search ..................... 702/34
See application file for complete search history.

(56) References Cited

U.S. PATENT DOCUMENTS 5,172,365 A * 12/1992 Call et al. ...................... 369/116
5,625,616 A 4/1997 Koike
7,138,970 B2 * 11/2006 Krohn ............................ 345/82
2005/0226288 A1 * 10/2005 Ryan et al. ................. 372/29.02
2008/0224966 A1 * 9/2008 Cok et al. ......................... 345/82
2010/0156311 A1 * 6/2010 Adachi et al. ................. 315/287

FOREIGN PATENT DOCUMENTS

JP 2000-168131 A 6/2000

* cited by examiner

*Primary Examiner* — Timothy Thompson
*Assistant Examiner* — Rhadames J Alonzo Miller
(74) *Attorney, Agent, or Firm* — Sughrue Mion, PLLC

(57) ABSTRACT

In a method for predicting the lifetime of a photo-semiconductor device that has a maximum light output value restricted by thermal saturation, the maximum light output value is extracted by measuring the characteristic of light output from the photo-semiconductor device with respect to drive current. The decrease tendency of the maximum output values with respect to drive time is predicted to predict the lifetime of the photo-semiconductor. Further, the predicted lifetime is updated as time passes. Therefore, in this method, even if drive condition changes, or an individual difference of the photo-semiconductor per se is present, it is possible to substantially accurately predict the lifetime of the photo-semiconductor.

10 Claims, 4 Drawing Sheets

METHOD FOR PREDICTING LIFETIME OF PHOTO-SEMICONDUCTOR DEVICE AND DRIVE APPARATUS

BACKGROUND OF THE INVENTION

1. Field of the Invention

The present invention relates to a method for predicting the lifetime of a photo-semiconductor device, such as a superluminescent diode, which is used in an optical measuring system.

2. Description of the Related Art

A superluminescent diode exhibits incoherence like an ordinary light-emitting diode. Further, the superluminescent diode is a photo-semiconductor device that exhibits a broad band spectral shape, and which can output light of up to approximately tens of mW like a semiconductor laser. The superluminescent diode, which has the aforementioned characteristics, is expected to be utilized as an incoherent light source that is needed in optical measurement fields, such as a fiber gyro (fiber gyroscope), a high-resolution OTDR (Optical Time Domain Reflectometer: Optical Time Domain Reflectometry), and an OCT (Optical Coherence Tomography: OCT Interferometer) in medical fields.

It is known that the value of drive current that needs to be output from a drive apparatus to maintain a predetermined drive output value at a photo-semiconductor device, such as the superluminescent diode, gradually increases with the passage of drive time. In other words, when electric current of a predetermined drive current value is applied to the photo-semiconductor device to cause the photo-semiconductor device to emit light, the drive output value at the photo-semiconductor device gradually becomes lower (so-called degradation (deterioration) occurs). Therefore, when the photo-semiconductor device is used in a measuring system, the aforementioned properties of the photo-semiconductor device are taken into consideration, and an automatic light-output adjustment circuit (APC circuit: automatic power control circuit) is used so that even if the photo-semiconductor device degrades (deteriorates), the light output from the photo-semiconductor device remains at the same level.

However, when the degradation progresses, the maximum light output value of light that can be output from the photo-semiconductor device per se becomes lower. Therefore, the photo-semiconductor device eventually becomes unable to output light of desirable output value anymore, in other words, the lifetime of the photo-semiconductor device ends.

Therefore, a technique for predicting the lifetime of a photo-semiconductor device has been proposed to prevent the photo-semiconductor device from ending its lifetime while the photo-semiconductor device is being driven. For example, methods for predicting the lifetime of the photo-semiconductor based on a drive current value for driving the optical-semiconductor, a slope efficiency value, or a light output value have been proposed (please refer to U.S. Pat. Nos. 5,172,365 and 5,625,616, and Japanese Unexamined Patent Publication No. 2000-168131). In all of these methods, the degree of degradation of the photo-semiconductor device from its initial condition is measured based on the drive current value for driving the photo-semiconductor or the like. Further, judgment is made as to whether the degree of degradation has reached a predetermined judgment value, such as a predetermined drive current value, to predict approach of the lifetime of the photo-semiconductor device to its end.

However, in some cases, actual drive conditions greatly fluctuate by external factors, such as the setting environment of the photo-semiconductor device or the way of using the photo-semiconductor device. Therefore, the predetermined judgment value is not always appropriate for actual use of the photo-semiconductor device. Specifically, it is certain that the lifetime of the photo-semiconductor device has a correlation with the drive current value for driving the photo-semiconductor device or the like. However, it is impossible to predict an accurate lifetime of the photo-semiconductor device based on the predetermined judgment value. Unlike a semiconductor laser, the properties of the superluminescent diode greatly change according to the drive temperature condition of the superluminescent diode. Therefore, the aforementioned problem is more evident in the superluminescent diode.

Therefore, the predetermined judgment value is set in such a manner to keep a certain margin or allowance from an estimated value, because the actual lifetime of the photo-semiconductor device may vary according to the drive condition of the photo semiconductor device. Since the judgment value is set in such a manner, even if it is judged that the lifetime of the photo-semiconductor device has ended, and the photo-semiconductor device is judged to be broken or damaged, there are cases in which the condition of the photo-semiconductor device is still sufficiently good to be used, which is wasteful.

SUMMARY OF THE INVENTION

In view of the foregoing circumstances, it is an object of the present invention to provide a method for substantially accurately predicting the lifetime of a photo-semiconductor device even if the drive condition of the photo-semiconductor device changes or an individual difference of the photo-semiconductor device per se is present. Further, it is another object of the present invention to provide a drive apparatus of a photo-semiconductor device. The drive apparatus can notify a substantially accurate lifetime of the photo-semiconductor device or a substantially accurate remaining amount of the lifetime by using the aforementioned method.

The inventor has conceived of the present invention by finding that the lifetime of a photo-semiconductor device having a maximum light output value restricted by thermal saturation is determined by decrease of the maximum light output value, which is caused by degradation of the photo-semiconductor device.

Specifically, a method for predicting the lifetime of a photo-semiconductor device according to the present invention is a method for predicting, based on the degradation tendency of a photo-semiconductor device, the lifetime of the photo-semiconductor device that outputs light at light output values including a maximum light output value that is restricted by thermal saturation, the method comprising the steps of:

extracting the maximum light output value of the photo-semiconductor device by measuring the characteristic of light output from the photo-semiconductor device with respect to drive current;

repeating the step of extracting the maximum light output value of the photo-semiconductor device at least once, thereby extracting a plurality of maximum light output values of the photo-semiconductor device at a plurality of extraction points in total;

calculating a degradation curve that approximates the characteristic of the maximum light output values with respect to drive time periods that have passed after initially driving the photo-semiconductor device;

calculating, based on the degradation curve, a drive time period at which the maximum light output value on the degradation curve and a drive light output value that is set in a drive apparatus of the photo-semiconductor device become the same; and predicting that the calculated drive time period is the lifetime of the photo-semiconductor device.

Here, the expression "a maximum light output value restricted by thermal saturation" means that when the drive current increases and the temperature of the photo-semiconductor device increases, the light output from the photo-semiconductor device eases due to thermal factors, thereby stopping an increase of the light output from the photo-semiconductor device with respect to the drive current as the drive current increases.

Further, the term "lifetime of the photo-semiconductor device" is a total time period in which the photo-semiconductor device can be driven. In other words, the term represents the total drivable time period of the photo-semiconductor device. Further, the state in which the photo-semiconductor device "can be driven" or "drivable" refers to a state in which the extracted maximum light output value is greater than or equal to a drive output value that is set at the drive apparatus of the photo-semiconductor device. Specifically, the "lifetime of the photo-semiconductor device" depends on the setting at the drive apparatus of the photo-semiconductor device.

Further, the term "maximum light output value" refers to the maximum value of light output values when the drive current is within a certain range. In other words, the term does not necessarily mean the absolute maximum value of light output values based on the characteristic of the light output values relative to the drive current.

Further, the expression "repeating the step" of extracting the maximum light output value means that the step of extracting the maximum light output value is carried out a plurality of times in total at a certain time interval between the steps. Further, the term "certain time interval" means a time interval that has a sufficient or appropriate length to analyze the degradation of the photo-semiconductor device from both a practical point of view and an economical point of view.

Further, the term "drive time period" means a total time period in which electric current has been supplied to the photo-semiconductor device, the total time period calculated from base drive time (initial drive time when the photo-semiconductor device was initially driven) of the photo-semiconductor device.

Further, the "degradation curve" means an approximation curve that approximates the tendency of distribution of the maximum light output values with respect to the drive time periods.

Further, the term "drive light output value" means a light output value that the drive apparatus of the photo-semiconductor needs when measurement is carried out by using the drive apparatus of the photo-semiconductor.

Further, in the method for predicting the lifetime of the photo-semiconductor device, the degradation curve may be a quadratic function curve. Further, the degradation curve may be calculated based on three of the plurality of maximum light output values that have been extracted at latest three extraction points.

Further, the photo-semiconductor device may be a superluminescent diode.

Further, a drive apparatus of the photo-semiconductor device according to the present invention is a drive apparatus of a photo-semiconductor device for causing the photo-semiconductor device to output light, the drive apparatus comprising:

a lifetime prediction means that predicts the lifetime of the photo-semiconductor device by using the method for predicting the lifetime of the photo-semiconductor device;

a remaining amount calculation means that calculates a remaining amount of the lifetime based on the lifetime and the drive time period in which the photo-semiconductor device has been actually driven;

a remaining amount notification means that notifies the remaining amount of the lifetime;

a timer for measuring the drive time periods that have passed after initially driving the photo-semiconductor device;

a light detection means that detects light output from the photo-semiconductor device; and a storage means that stores the light output values of the light, which include the maximum light output values, a drive current when the light is output at each of the light output values, and the drive time periods when the light is detected.

Further, the drive apparatus of the photo-semiconductor device may further include a warning means that warns that the remaining amount has become less than or equal to a predetermined value.

In the method for predicting the lifetime of the photo-semiconductor device according to the present invention, the lifetime of the photo-semiconductor device that outputs light at light output values including a maximum light output value that is restricted by thermal saturation is predicted based on a change in the maximum light output value of the photo-semiconductor device with the passage of time. Specifically, in the present invention, the lifetime is directly predicted, compared with a method of predicting the lifetime based on whether a value, such as a drive current value, has approached a predetermined judgment value.

Therefore, in the present invention, even if the degradation of the photo-semiconductor is affected by an individual difference of the photo-semiconductor device or the environment of the photo-semiconductor device during use, it is possible to substantially accurately predict the lifetime of the photo-semiconductor device.

Further, the drive apparatus of the photo-semiconductor device according to the present invention predicts the lifetime of the photo-semiconductor device by using the aforementioned method for predicting the lifetime of the photo-semiconductor device according to the present invention. Therefore, it is possible to notify an operator of a substantially accurate remaining amount of the lifetime.

Accordingly, in the present invention, it is possible to prevent an event of ending the lifetime of the photo-semiconductor device while the drive apparatus is used. Further, it is possible to prevent a wasteful operation of stopping use of the photo-semiconductor device much earlier than actual end of the lifetime of the photo-semiconductor device, as a result of trying to prevent the event of ending the lifetime of the photo-semiconductor device while the drive apparatus is used. Hence, it is possible to economically use the photo-semiconductor device.

DESCRIPTION OF THE PREFERRED EMBODIMENTS

Hereinafter, embodiments of the present invention will be described with reference to drawings. However, the present invention is not limited to the following embodiments.

"Method for Predicting Lifetime of Photo-Semiconductor Device"

A method for predicting the lifetime of a photo-semiconductor device according to the present invention utilizes the characteristic of the photo-semiconductor device that the lifetime of the photo-semiconductor device that outputs light at light output values including a maximum light output value that is restricted by thermal saturation is determined by a decrease in the maximum light output value due to degradation of the photo-semiconductor device.

The principle of the method for predicting the lifetime will be described in detail with reference to drawings.

Figure 1:
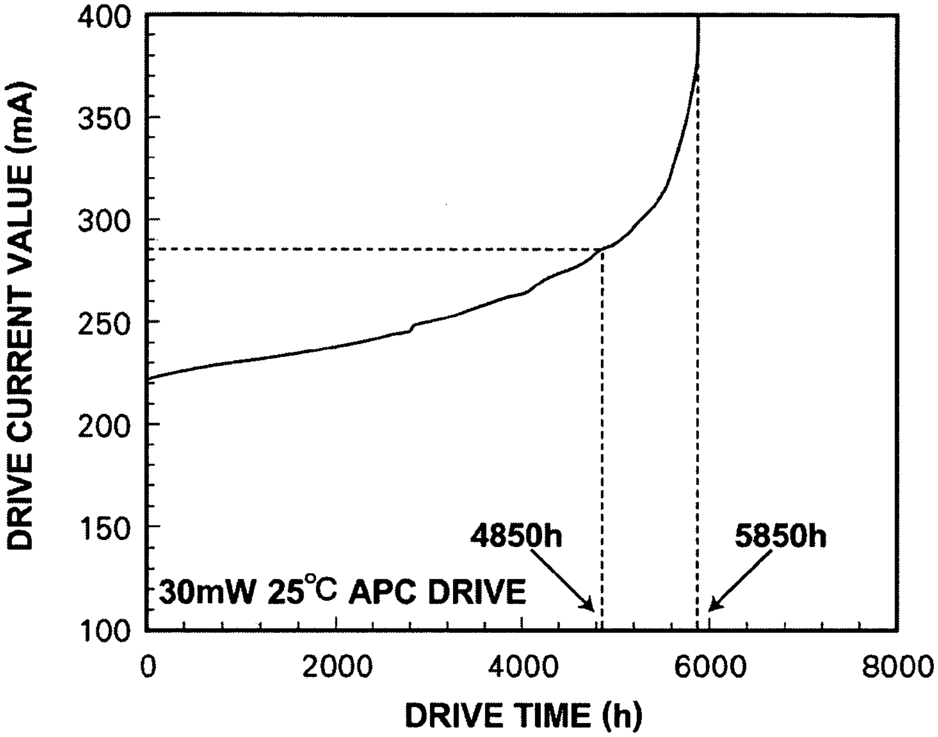
FIG. 1 is a diagram illustrating an example of the degradation characteristic of a photo-semiconductor device.

As illustrated in FIG. 1, a phenomenon that a drive current value for outputting light of a drive light output value (30 mW, in this example) that is set in a drive apparatus of a photo-semiconductor device increases as time (drive time) in which the photo-semiconductor device is used passes. In other words, so-called degradation of the photo-semiconductor device occurs. It is known that when drive current that is 1.2 to 1.3 times of the initial drive current value is applied to the photo-semiconductor device to achieve the predetermined drive light output value, the drive light output value sharply decreases thereafter. Therefore, in conventional methods, the drive current value is measured to predict the lifetime of the photo-semiconductor device. However, the values of "1.2 to 1.3 times" that are used to predict the lifetime are empirical values, which are applicable not to all kinds of photo-semiconductor devices.

Figure 2:
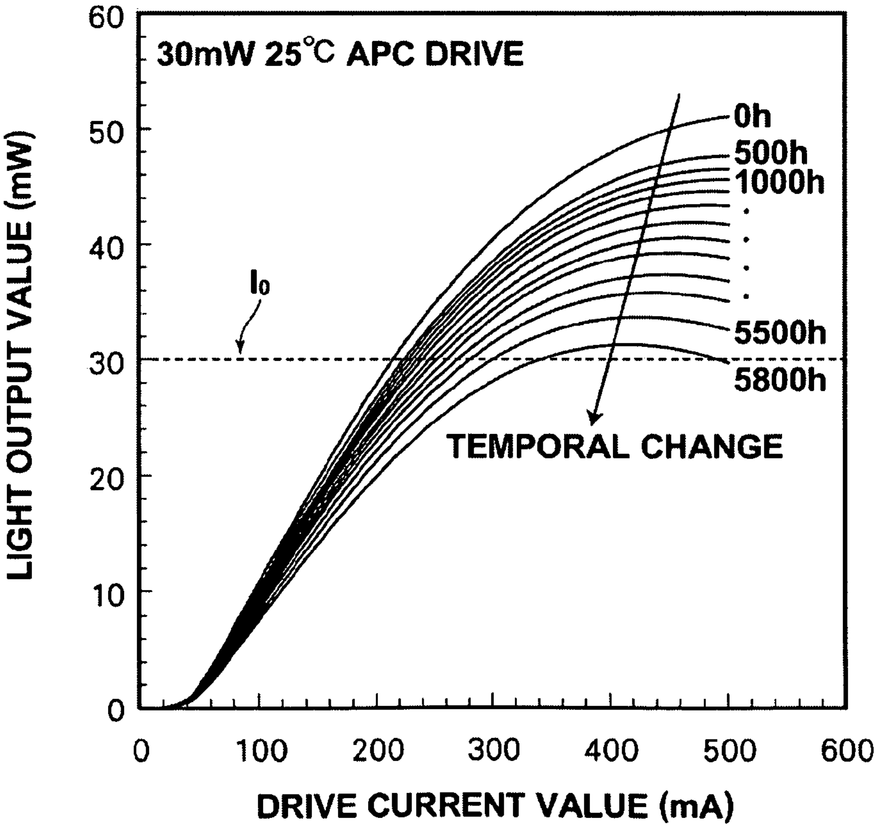
FIG. 2 is a diagram illustrating a change in the drive-current to light-output characteristic of the photo-semiconductor device with the passage of time.

In FIG. 2, temporal changes in the drive-current to light-output characteristic of the photo-semiconductor device that exhibits degradation in FIG. 1 are plotted. FIG. 2 clearly indicates that the maximum light output values become lower with the passage of time. Further, FIGS. 1 and 2 show that when the maximum light output value becomes the same as the drive light output value $I_0$ and becomes lower than the drive light output value $I_0$, the photo-semiconductor device is broken. Specifically, when the maximum value of light that can be output from the photo-semiconductor becomes lower than the drive light output value $I_0$, it becomes impossible to output light of a desirable output value even if the drive current value is increased.

Figure 3:
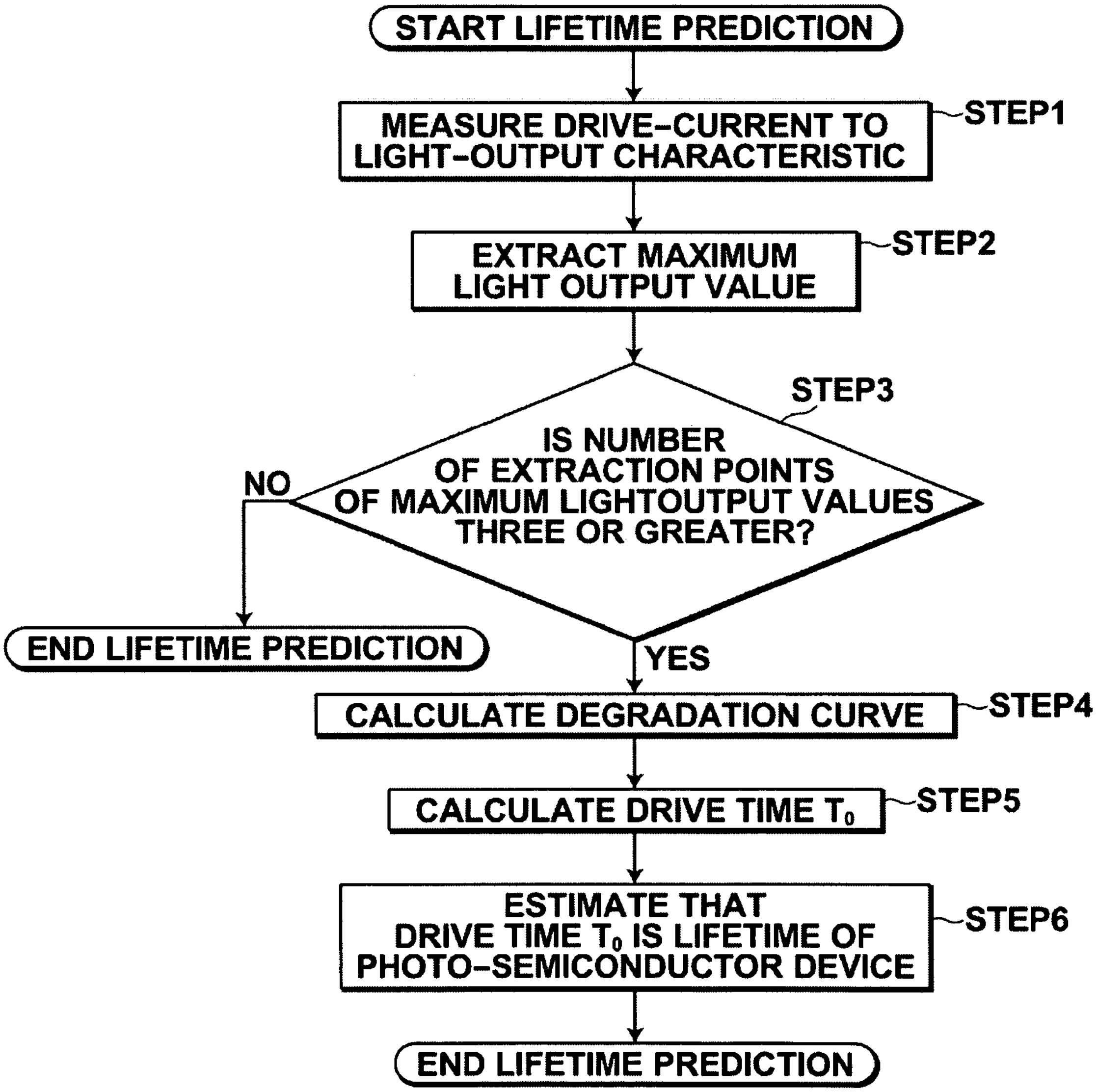
FIG. 3 is a flow chart showing an example of a control program for a method for predicting the lifetime of a photo-semiconductor device.

Therefore, in the method for predicting the lifetime of the photo-semiconductor device according to the present invention, the decrease tendency of the maximum light output value with respect to the drive time (drive time period) is predicted to predict the lifetime of the photo-semiconductor device. Further, the lifetime of the photo-semiconductor device is updated as time passes. FIG. 3 is a flow chart showing a control program for carrying out the method for predicting the lifetime of the photo-semiconductor device according to the present embodiment.

As illustrated in FIG. 3, the method for predicting the lifetime of the photo-semiconductor device according to the present embodiment is carried out through the following steps. First, the light-output to drive-current characteristic of the photo-semiconductor device that outputs light at light output values including the maximum light output value that is restricted by thermal saturation is measured (STEP 1) to extract the maximum light output value (STEP 2). If the number of extraction points at which the maximum light output values are extracted has not reached a predetermined number, the lifetime prediction process in this turn (cycle) is ended. If the number of extraction points has reached the predetermined number, the process moves to the next step (STEP 3). Then, a degradation curve that approximates the characteristic of the maximum light output values with respect to drive time periods from the initial drive of the photo-semiconductor device is calculated (STEP 4). Further, drive time period $T_0$ at which the maximum light output value on the degradation curve becomes the same as the drive light output value $I_0$ that is set in the drive apparatus of the photo-semiconductor device is obtained based on the degradation curve (STEP 5). Then, it is predicted that the obtained drive time period $T_0$ is the lifetime of the photo-semiconductor device (STEP 6).

The photo-semiconductor device is not particularly limited as long as the maximum light output value of the photo-semiconductor device is restricted by thermal saturation. Examples of the photo-semiconductor device are a semiconductor laser, a superluminescent diode, and the like.

In STEP 1, drive current is supplied to the photo-semiconductor device, and the value of the drive current is gradually changed to measure the characteristic of the light output from the photo-semiconductor device with respect to drive current in a certain range. The range of changing the drive current is not particularly limited. The range of changing the drive current may be appropriately set based on the output performance of the photo-semiconductor device, the type of the photo-semiconductor device, a drive time period of the photo-semiconductor device till that point in time and the like. For example, when the maximum light output value of the photo-semiconductor device is restricted by thermal saturation, it is not necessary to increase the drive current after reaching the local maximum by thermal saturation. Further, when the remaining lifetime of the photo-semiconductor device is still long, and very accurate prediction of the lifetime of the photo-semiconductor device is not required, it is not necessary that the drive current is increased so that the light output reaches the local maximum. That is because in some cases, it is sufficient to measure an accurate maximum light output value (which is the local maximum) only after accurate lifetime prediction is required.

Further, the timing of repeating the process of STEP 1 is not particularly limited. For example, STEP 1 may be performed when a certain time period has passed after initially driving the photo-semiconductor device or at predetermined intervals. If the remaining lifetime is long, the time period or the intervals may be increased. If the remaining lifetime is short, the time period or the intervals may be shortened. Further, STEP 1 may be performed when the operation of the drive apparatus of the photo-semiconductor device is started or stopped so as not to disturb the operator of the drive apparatus.

In STEP 2, the maximum light output value is extracted based on the characteristic obtained in STEP 1. As the method for determining the maximum light output value, there are two methods in connection with the aforementioned matters. In one of the two methods, when a local maximum is present in the scanned range of drive current, the local maximum is determined as the maximum light output value. In the other method, when a local maximum is not present in the scanned range of drive current, the light output value corresponding to the maximum drive current value is determined as the maximum light output value. In FIG. 2, the latter method is used to determine the maximum light output value during the drive time period of from the initial drive to approximately 1000 hours, and the former method is used to determine the maximum light output value after then. The two methods are adopted in such a manner, because when the remaining lifetime is long, and accurate prediction of the lifetime is not required, even if the latter method is used, solution of the problem to be solved by the present invention is not influenced. Since the photo-semiconductor device is not unnecessarily driven, it is possible to more efficiently use the photo-semiconductor device.

In STEP 3, judgment is made as to whether a sufficient number of extraction points of the maximum light output values have been obtained before obtaining the approximation curve that approximates the characteristic of the maximum light output values with respect to the drive time periods. For example, in the present embodiment, the sufficient number of the extraction points is set to three. The number is set to three by considering that since the decrease tendency of the maximum light output values is not a linear function, a quadratic function curve, which is the lowest order approximation curve except the linear function, is used to approximate the characteristic. However, in the present invention, the number of the extraction points is not limited to three.

In STEP 4, an approximation curve (degradation curve) that approximates the characteristic of the maximum light output value with respect to the drive time period is obtained. For example, in the present embodiment, a quadratic function curve is used to approximate the characteristic (please refer to FIG. 4). However, the approximation curve is not particularly limited to the quadratic function curve. Alternatively, other curves, such as a higher-order function curve and a logarithmic function curve, may be used. Further, the approximation curve may be obtained by using all extraction points. Alternatively, only some of the values obtained at the extraction points may be used. Actually, when the degradation of the photo-semiconductor device progresses or continues, a difference (shift) from the approximation curve increases. Therefore, if only the maximum light output values in the vicinity of the most recent extraction point are used, a more accurate lifetime can be obtained. For example, FIG. 5 illustrates a case in which latest three extraction points are used to calculate the lifetime of the photo-semiconductor device. As described later in detail, if the extraction points are selected in such a manner, it is possible to predict the lifetime of the photo-semiconductor device so that the current state of the photo-semiconductor device is reflected in the prediction. Hence, it is possible to actually improve the accuracy in prediction of the lifetime of the photo-semiconductor device.

In STEP 5 and STEP 6, the degradation curve is used, and drive time period $T_0$ (point P' in FIG. 4) at which the maximum light output value on the degradation curve and the drive light output value $I_0$ become the same is calculated. Further, the calculated drive time period $T_0$ is estimated as the lifetime of the photo-semiconductor device. Specifically, the degradation curve indicates the decrease tendency of the maximum light output values. When the maximum light output value on the degradation curve and the drive light output value $I_0$ become the same, and further, the maximum light output value becomes lower than the drive light output value $I_0$, it becomes impossible to output light of the drive light output value $I_0$, which is desired by the drive apparatus of the photo-semiconductor device. Therefore, it is predicted that this drive time period $T_0$ is the lifetime of the photo-semiconductor device.

Next, with reference to drawings, the action of the method for predicting the lifetime of the photo-semiconductor device according to the present embodiment will be described.

Figure 4:
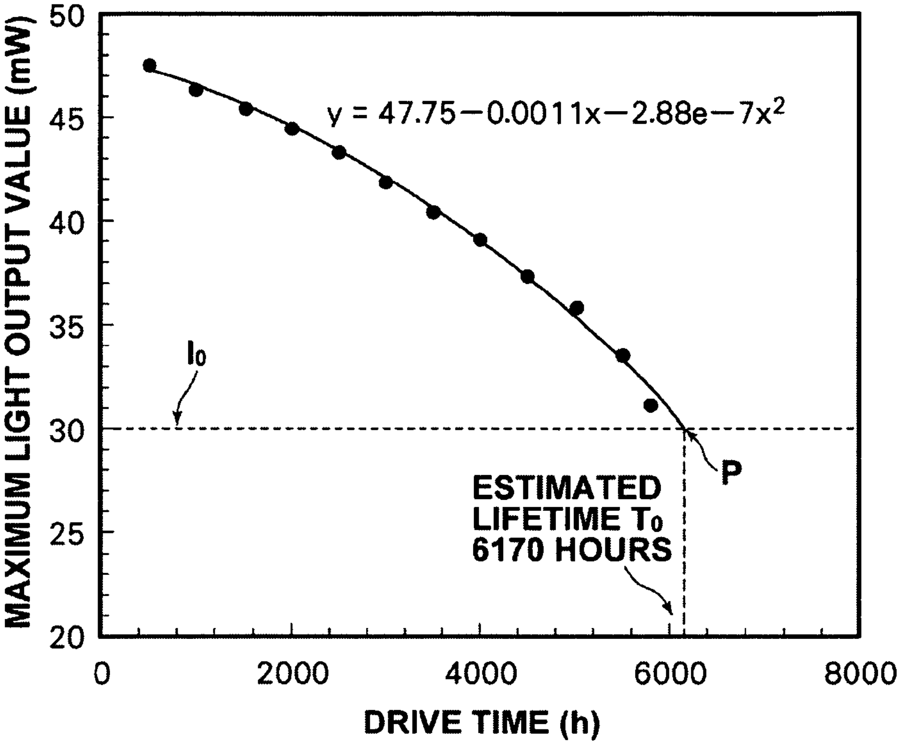
FIG. 4 is a diagram illustrating a relationship between drive time periods and maximum light output values (a case of approximating values using all points)
Figure 5:
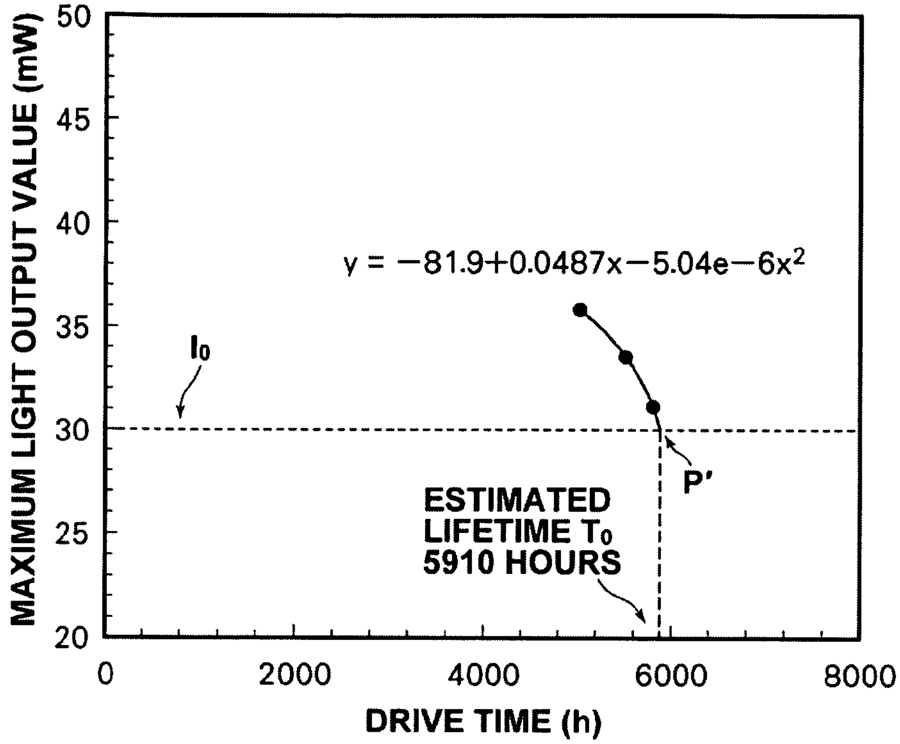
FIG. 5 is a diagram illustrating a relationship between drive time periods and maximum light output values (a case of approximating values using latest three points)

FIG. 4 is a diagram illustrating the relationship between the drive time period and the maximum light output value. The curve illustrated in FIG. 4 is an approximation curve with respect to the maximum light output values. FIG. 4 shows that the maximum light output values can substantially approximate a quadratic function curve. Therefore, if the approximation curve is extended, it is possible to predict the lifetime of the photo-semiconductor device. In FIG. 5, only a part of the extraction points of the maximum light output values in FIG. 4 are used (latest three points) to approximate a quadratic function curve.

Next, a case in which the present invention was applied to a photo-semiconductor device that had a drive condition of 30 mW will be described. In this example, the actual lifetime of the photo-semiconductor device was 5850 hours (FIG. 1).

When all of the extraction points of the maximum light output values were used (FIG. 4), the predicted lifetime was 6170 hours (an error with respect to the actual lifetime: 5.4%). In contrast, when only the maximum light output values in the vicinity of a recent extraction point were used (FIG. 5), the predicted lifetime was 5910 hours (an error with respect to the actual lifetime: 1.0%). This shows that a more accurate lifetime can be obtained by using only the maximum light output values in the vicinity of the recent extraction point. Meanwhile, when the lifetime is calculated by using the conventional technique that judges that time at which the drive current value increases to 1.3 times of the initial drive current value is the lifetime of the photo-semiconductor device, the lifetime of the photo-semiconductor device is 4850 hours (an error with respect to the actual lifetime: −17.1%) (FIG. 1). As described above, the method for predicting the lifetime of the photo-semiconductor device according to the present invention can much more accurately predict the lifetime of the photo-semiconductor device compared with the conventional method.

The method according to the present invention can accurately predict the lifetime because of the following reasons. In the method for predicting the lifetime of the photo-semiconductor device according to the present invention, the lifetime of the photo-semiconductor device that outputs light at light output values including a maximum light output value that is restricted by thermal saturation is predicted based on a change in the maximum light output value with the passage of time. Specifically, compared with a method for predicting the lifetime based on whether the drive current value or the like has approached a predetermined judgment value of the drive current value or the like, the present invention can directly predict the lifetime. Hence, even if an individual difference of the photo-semiconductor device or the environment in which the photo-semiconductor device is used influence the degradation of the photo-semiconductor device, it is possible to substantially accurately predict the lifetime of the photo-semiconductor device.

Accordingly, it is possible to prevent an event of ending the lifetime of the photo-semiconductor device while the drive apparatus is used. Further, it is possible to prevent a wasteful operation of stopping use of the photo-semiconductor device much earlier than the actual end of the lifetime of the photo-semiconductor device, as a result of trying to prevent the aforementioned event. Hence, it is possible to economically use the photo-semiconductor device.

"Drive Apparatus of Photo-Semiconductor Device"

Figure 6:
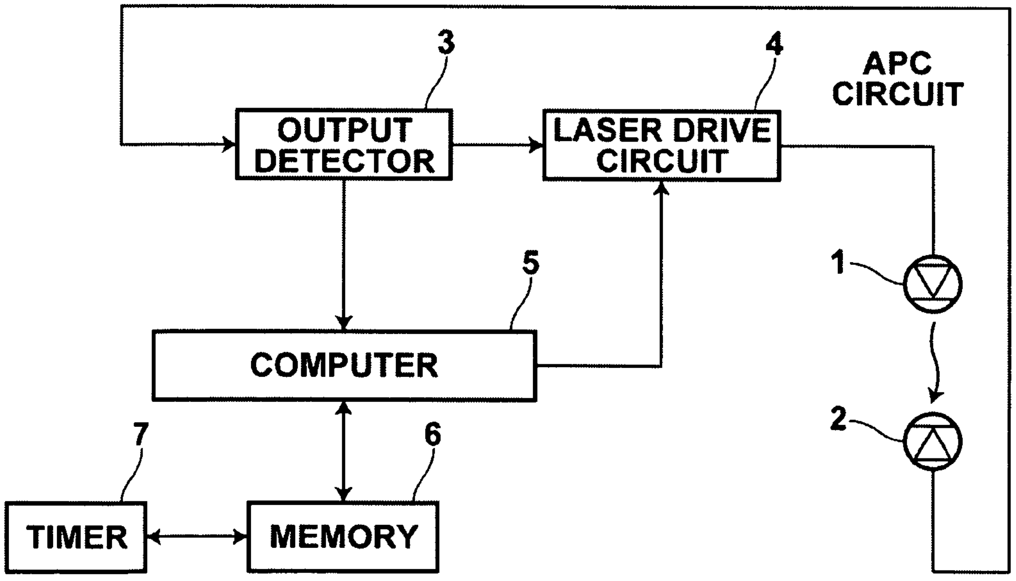
FIG. 6 is a system diagram illustrating an example of a drive apparatus of the photo-semiconductor device.

FIG. 6 is a system diagram illustrating a drive apparatus of a photo-semiconductor device according to the present embodiment.

The drive apparatus of the photo-semiconductor device according to the present invention includes a photo-semiconductor device 1 for outputting light, and a photo-detector (light detector) 2 for measuring light output values. Further, the drive apparatus of the photo-semiconductor device includes a control circuit of the photo-semiconductor device 1 (an output detector 3 and a laser drive circuit 4) and a computer including a lifetime prediction means, a remaining amount calculation means and a remaining amount notification means. Further, the drive apparatus of the photo-semiconductor device includes a memory 6 for storing data that is necessary to predict the lifetime of the photo-semiconductor device, and a timer 7 for measuring drive time periods of the photo-semiconductor device 1.

The photo-semiconductor device 1 is not particularly limited as long as the maximum light output value of the photo-semiconductor device 1 is restricted by thermal saturation, as in the method for predicting the lifetime of the photo-semiconductor device according to the present invention. The photo-semiconductor device 1 may be a semiconductor laser, a superluminescent diode and the like.

Next, an example in which the drive apparatus of the present invention has been applied to an APC circuit system will be described. The APC circuit is an automatic light output adjustment circuit, as described above. The APC circuit controls the operation so that the light output from the photo-semiconductor device 1 remains at a constant level even if the performance of the photo-semiconductor device 1 degrades or the drive condition of the photo-semiconductor device 1 changes.

The operation of the APC circuit is as follows. In FIG. 6, light output from the photo-semiconductor device 1 is detected by the photo-detector 2, and a signal output from the photo-detector 2 is input to the output detector 3. Further, the output detector 3 obtains a difference between the actual output value and a desirable output value (intended output value), and data representing the difference is sent to the laser drive circuit 4. The laser drive circuit 4 controls the drive current value so that the light output from the photo-semiconductor device 1 becomes an optimum level.

In the present embodiment, the maximum light output values are extracted by using the photo-semiconductor device 1 and the photo-detector 2 in the APC circuit system. Therefore, measurement of the drive-current to light-output characteristic is performed during a so-called warm-up period when the system is started or like, in which it is not necessary to drive the photo-semiconductor device 1. The laser drive circuit 4 drives the photo-semiconductor device 1 till light output from the photo-semiconductor device 1 saturates by thermal saturation. The light output detected by the photo-detector 2 is sent to the computer 5 through the output detector 3 to obtain the maximum light output value. The drive time period of the photo-semiconductor device 1 measured by the timer 7 and the maximum light output value are stored in the memory 6. Further, the computer 5 calculates the predicted lifetime of the photo-semiconductor device, based on these kinds of data stored in the memory 6, by using the aforementioned method for predicting the lifetime of the photo-semiconductor device. Further, the computer 5 calculates a substantially accurate remaining amount of lifetime by subtracting the drive time period till that point from the predicted lifetime. Further, the computer 5 notifies the operator of the remaining amount of the lifetime. If the remaining amount of the lifetime is less than or equal to a set value, the computer 5 notifies the operator of such a condition.

The remaining amount notification means may notify the remaining amount by using a display or by blinking a lamp (light) or the like.

As described above, in the present embodiment, the aforementioned method for predicting the lifetime of the photo-semiconductor device is used. Further, the lifetime prediction means for predicting the lifetime of the photo-semiconductor device, the remaining amount calculation means for calculating the remaining amount of the lifetime based on the lifetime and the actual drive time period of the photo-semiconductor device, and the remaining amount notification means for notifying the remaining amount of the lifetime are provided. Therefore, it is possible to notify the operator of a substantially accurate remaining amount of the lifetime of the photo-semiconductor device.

Therefore, it is possible to prevent an event of ending the lifetime of the photo-semiconductor device while the drive apparatus is used. Further, it is possible to prevent a wasteful operation of stopping use of the photo-semiconductor device much earlier than the actual end of the lifetime of the photo-semiconductor device, as a result of trying to prevent the aforementioned event. Hence, it is possible to economically use the photo-semiconductor device.

What is claimed is:

1. A method for predicting, based on the degradation tendency of a photo-semiconductor device, the lifetime of the photo-semiconductor device that outputs light at light output values including a maximum light output value that is restricted by thermal saturation, the method comprising using one or more processors to perform the steps of:

extracting the maximum light output value of the photo-semiconductor device by measuring the characteristic of light output from the photo-semiconductor device with respect to drive current;

repeating the step of extracting the maximum light output value of the photo-semiconductor device at least once, thereby extracting a plurality of maximum light output values of the photo-semiconductor device at a plurality of extraction points in total;

calculating a degradation curve that approximates the characteristic of the maximum light output values with respect to drive time periods that have passed after initially driving the photo-semiconductor device;

calculating, based on the degradation curve, a drive time period at which the maximum light output value on the degradation curve and a drive light output value that is set in a drive apparatus of the photo-semiconductor device become the same; and predicting that the calculated drive time period is the lifetime of the photo-semiconductor device.

2. A method for predicting the lifetime of a photo-semiconductor device, as defined in claim 1, wherein the degradation curve is a quadratic function curve.

3. A method for predicting the lifetime of a photo-semiconductor device, as defined in claim 1, wherein the degradation curve is calculated based on three of the plurality of maximum light output values that have been extracted at latest three extraction points.

4. A method for predicting the lifetime of a photo-semiconductor device, as defined in claim 2, wherein the degradation curve is calculated based on three of the plurality of maximum light output values that have been extracted at latest three extraction points.

5. A method for predicting the lifetime of a photo-semiconductor device, as defined in claim 1, wherein the photo-semiconductor device is a superluminescent diode.

6. A method for predicting the lifetime of a photo-semiconductor device, as defined in claim 2, wherein the photo-semiconductor device is a superluminescent diode.

7. A method for predicting the lifetime of a photo-semiconductor device, as defined in claim 3, wherein the photo-semiconductor device is a superluminescent diode.

8. A method for predicting the lifetime of a photo-semiconductor device, as defined in claim 4, wherein the photo-semiconductor device is a superluminescent diode.

9. A drive apparatus of a photo-semiconductor device for causing the photo-semiconductor device to output light, the drive apparatus comprising:

a lifetime prediction means that predicts the lifetime of the photo-semiconductor device by using the method for predicting the lifetime of the photo-semiconductor device, as defined in claim 1;

a remaining amount calculation means that calculates a remaining amount of the lifetime based on the lifetime and the drive time period in which the photo-semiconductor device has been actually driven;

a remaining amount notification means that notifies the remaining amount of the lifetime;

a timer for measuring the drive time periods that have passed after initially driving the photo-semiconductor device;

a light detection means that detects light output from the photo-semiconductor device; and a storage means that stores the light output values of the light, which include the maximum light output values, a drive current when the light is output at each of the light output values, and the drive time periods when the light is detected.

10. A drive apparatus of a photo-semiconductor device, as defined in claim 9, further comprising:

a warning means that warns that the remaining amount has become less than or equal to a predetermined value.

* * * * *